(12) United States Patent
Hanna et al.

(10) Patent No.: US 9,716,814 B2
(45) Date of Patent: *Jul. 25, 2017

(54) BIOMETRIC CAMERA MOUNT SYSTEM (71) Applicant: EyeLock Inc., Caguas, PR (US)

(72) Inventors: Keith J. Hanna, New York, NY (US);
George Herbert Needham Riddle,
Princeton, NJ (US)

(73) Assignee: EyeLock LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,444

(22) Filed: Apr. 15, 2015

(65) Prior Publication Data
US 2016/0065797 A1 Mar. 3, 2016

Related U.S. Application Data (63) Continuation of application No. 14/075,232, filed on Nov. 8, 2013, now abandoned, which is a
(Continued)

(51) Int. Cl.
*G03B 35/00* (2006.01)
*H04N 5/225* (2006.01)
(Continued)

(52) U.S. Cl.
CPC ........... *H04N 5/2252* (2013.01); *G03B 41/00* (2013.01); *G06K 9/00255* (2013.01);
(Continued)

(58) Field of Classification Search
USPC ......... 396/322, 324, 325; 340/3.1, 5.52–5.53
See application file for complete search history.

(56) References Cited

U.S. PATENT DOCUMENTS

| 4,641,349 A | 2/1987 | Flom et al. |
| 5,259,040 A | 11/1993 | Hanna |

(Continued)

FOREIGN PATENT DOCUMENTS

| WO | WO-2008/036897 | 3/2008 | |
| WO | WO 2008036897 A1 * | 3/2008 | ......... G06K 9/00604 |

(Continued)

OTHER PUBLICATIONS

B. Galvin, et al., Recovering Motion Fields: An Evaluation of Eight Optical Flow Algorithms, Proc. of the British Machine Vision Conf. (1998).
(Continued)

*Primary Examiner* — Minh Phan
(74) *Attorney, Agent, or Firm* — Foley & Lardner LLP; Paul M. H. Pua (57) ABSTRACT

A system for reducing the substantially vertical extent of a wide-area biometric system and for reducing the cost and complexity of installation while maintaining high biometric performance, using a substantially horizontally configuration of cameras, preferably with an attention mechanism, and using a precision calibration system that can be used by an unskilled technician and that does not require an accurate site survey or additional materials or equipment.

20 Claims, 5 Drawing Sheets

Related U.S. Application Data continuation of application No. 13/464,710, filed on May 4, 2012, now Pat. No. 8,606,097, which is a continuation of application No. 12/749,663, filed on Mar. 30, 2010, now Pat. No. 8,195,044.

(60) Provisional application No. 61/164,528, filed on Mar. 30, 2009.

(51) Int. Cl.
| | | |
|---|---|---|
| *G06K 9/20* | (2006.01) | |
| *G03B 41/00* | (2006.01) | |
| *G06K 9/00* | (2006.01) | |
| *H04N 5/232* | (2006.01) | |
| *H04N 5/247* | (2006.01) | |

(52) U.S. Cl.
CPC ......... *G06K 9/209* (2013.01); *H04N 5/23293* (2013.01); *H04N 5/247* (2013.01)

(56) References Cited

U.S. PATENT DOCUMENTS

| | | | |
|---|---|---|---|
| 5,291,560 | A | 3/1994 | Daugman |
| 5,488,675 | A | 1/1996 | Hanna |
| 5,572,596 | A | 11/1996 | Wildes et al. |
| 5,581,629 | A | 12/1996 | Hanna et al. |
| 5,613,012 | A | 3/1997 | Hoffman et al. |
| 5,615,277 | A | 3/1997 | Hoffman |
| 5,737,439 | A | 4/1998 | Lapsley et al. |
| 5,764,789 | A | 6/1998 | Pare et al. |
| 5,802,199 | A | 9/1998 | Pare et al. |
| 5,805,719 | A | 9/1998 | Pare et al. |
| 5,838,812 | A | 11/1998 | Pare et al. |
| 5,901,238 | A | 5/1999 | Matsushita |
| 5,953,440 | A | 9/1999 | Zhang et al. |
| 5,978,494 | A | 11/1999 | Zhang |
| 6,021,210 | A | 2/2000 | Camus et al. |
| 6,028,949 | A | 2/2000 | McKendall |
| 6,064,752 | A | 5/2000 | Rozmus et al. |
| 6,069,967 | A | 5/2000 | Rozmus et al. |
| 6,144,754 | A | 11/2000 | Okano et al. |
| 6,192,142 | B1 | 2/2001 | Pare et al. |
| 6,247,813 | B1 | 6/2001 | Kim et al. |
| 6,252,977 | B1 | 6/2001 | Salganicoff et al. |
| 6,289,113 | B1 | 9/2001 | McHugh et al. |
| 6,366,682 | B1 | 4/2002 | Hoffman et al. |
| 6,373,968 | B2 | 4/2002 | Okano et al. |
| 6,377,699 | B1 | 4/2002 | Musgrave et al. |
| 6,424,727 | B1 | 7/2002 | Musgrave et al. |
| 6,483,930 | B1 | 11/2002 | Musgrave et al. |
| 6,532,298 | B1 | 3/2003 | Cambier et al. |
| 6,542,624 | B1 | 4/2003 | Oda |
| 6,546,121 | B1 | 4/2003 | Oda |
| 6,594,376 | B2 | 7/2003 | Hoffman et al. |
| 6,594,377 | B1 | 7/2003 | Kim et al. |
| 6,652,099 | B2 | 11/2003 | Chae et al. |
| 6,700,998 | B1 | 3/2004 | Murata |
| 6,714,665 | B1 | 3/2004 | Hanna et al. |
| 6,760,467 | B1 | 7/2004 | Min et al. |
| 6,850,631 | B1 | 2/2005 | Oda et al. |
| 6,917,695 | B2 | 7/2005 | Teng et al. |
| 6,980,670 | B1 | 12/2005 | Hoffman et al. |
| 6,985,608 | B2 | 1/2006 | Hoffman et al. |
| 7,095,901 | B2 | 8/2006 | Lee et al. |
| 7,146,027 | B2 | 12/2006 | Kim et al. |
| 7,248,719 | B2 | 7/2007 | Hoffman et al. |
| 7,271,939 | B2 | 9/2007 | Kono |
| 7,298,969 | B2 | 11/2007 | Elberbaum |
| 7,385,626 | B2 | 6/2008 | Aggarwal et al. |
| 7,414,737 | B2 | 8/2008 | Cottard et al. |
| 7,418,115 | B2 | 8/2008 | Northcott et al. |
| 7,428,320 | B2 | 9/2008 | Northcott et al. |
| 7,542,590 | B1 | 6/2009 | Robinson et al. |
| 7,558,406 | B1 | 7/2009 | Robinson et al. |
| 7,558,407 | B2 | 7/2009 | Hoffman et al. |
| 7,574,021 | B2 | 8/2009 | Matey |
| 7,583,822 | B2 | 9/2009 | Guillemot et al. |
| 7,606,401 | B2 | 10/2009 | Hoffman et al. |
| 7,616,788 | B2 | 11/2009 | Hsieh et al. |
| 7,639,840 | B2 | 12/2009 | Hanna et al. |
| 7,693,307 | B2 | 4/2010 | Rieul et al. |
| 7,697,786 | B2 | 4/2010 | Camus et al. |
| 7,715,595 | B2 | 5/2010 | Kim et al. |
| 7,719,566 | B2 | 5/2010 | Guichard |
| 7,797,606 | B2 | 9/2010 | Chabanne |
| 7,843,487 | B2 * | 11/2010 | Tojima .................. H04N 5/232 348/159 |
| 7,869,627 | B2 | 1/2011 | Northcott et al. |
| 7,929,732 | B2 | 4/2011 | Bringer et al. |
| 7,978,883 | B2 | 7/2011 | Rouh et al. |
| 8,009,876 | B2 | 8/2011 | Kim et al. |
| 8,025,399 | B2 | 9/2011 | Northcott et al. |
| 8,092,021 | B1 | 1/2012 | Northcott et al. |
| 8,132,912 | B1 | 3/2012 | Northcott et al. |
| 8,170,295 | B2 | 5/2012 | Fujii et al. |
| 8,233,680 | B2 | 7/2012 | Bringer et al. |
| 8,243,133 | B1 | 8/2012 | Northcott et al. |
| 8,279,042 | B2 | 10/2012 | Beenau et al. |
| 8,317,325 | B2 | 11/2012 | Raguin et al. |
| 2003/0093805 | A1 | 5/2003 | Gin |
| 2004/0119881 | A1 * | 6/2004 | Matko .................. B60R 11/04 348/375 |
| 2005/0084137 | A1 | 4/2005 | Kim et al. |
| 2006/0074986 | A1 | 4/2006 | Mallalieu et al. |
| 2007/0013779 | A1 | 1/2007 | Gin et al. |
| 2007/0122011 | A1 | 5/2007 | Takizawa |
| 2007/0211922 | A1 | 9/2007 | Crowley et al. |
| 2008/0225129 | A1 * | 9/2008 | Viinikanoja ....... H04N 13/0239 348/218.1 |
| 2009/0074256 | A1 | 3/2009 | Haddad |
| 2009/0097715 | A1 | 4/2009 | Cottard et al. |
| 2009/0161925 | A1 | 6/2009 | Cottard et al. |
| 2009/0231096 | A1 | 9/2009 | Bringer et al. |
| 2010/0021016 | A1 | 1/2010 | Cottard et al. |
| 2010/0074477 | A1 | 3/2010 | Fujii et al. |
| 2010/0127826 | A1 | 5/2010 | Saliba et al. |
| 2010/0246903 | A1 | 9/2010 | Cottard |
| 2010/0278394 | A1 | 11/2010 | Raguin et al. |
| 2010/0310070 | A1 | 12/2010 | Bringer et al. |
| 2011/0158486 | A1 | 6/2011 | Bringer et al. |
| 2011/0194738 | A1 | 8/2011 | Choi et al. |
| 2011/0277518 | A1 | 11/2011 | Lais et al. |
| 2012/0240223 | A1 | 9/2012 | Tu |
| 2012/0257797 | A1 | 10/2012 | Leyvand et al. |

FOREIGN PATENT DOCUMENTS

| | | |
|---|---|---|
| WO | WO-2010/062371 | 6/2010 |
| WO | WO-2011/093538 | 8/2011 |

OTHER PUBLICATIONS

J. R. Bergen, et al., Hierarchical Model-Based Motion Estimation, European Conf. on Computer Vision (1993).

K. Nishino, et al., The World in an Eye, IEEE Conf. on Pattern Recognition, vol. 1, at pp. 444-451 (Jun. 2004).

Notice of Allowance on U.S. Appl. No. 12/749,663 dated Feb. 7, 2012.

Notice of Allowance on U.S. Appl. No. 13/464,710 dated Mar. 29, 2013.

Notice of Allowance on U.S. Appl. No. 13/464,710 dated Jul. 24, 2013.

Office Action on U.S. Appl. No. 12/749,663 dated Feb. 23, 2011.
Office Action on U.S. Appl. No. 13/464,710 dated Jan. 9, 2013.
Office Action on U.S. Appl. No. 13/464,710 dated Jul. 3, 2012.
Office Action on U.S. Appl. No. 14/075,232 dated Oct. 15, 2014.
Office Action on U.S. Appl. No. 14/075,232 dated Feb. 25, 2014.
R. Kumar, et al., Direct recovery of shape from multiple views: a parallax based approach, 12th IAPR Int'l Conf. on Pattern Recognition.

(56) References Cited

OTHER PUBLICATIONS

R. P. Wildes, Iris Recognition: An Emerging Biometric Technology, Proc. IEEE 85(9) at pp. 1348-1363 (Sep. 1997).

* cited by examiner

BIOMETRIC CAMERA MOUNT SYSTEM

CROSS-REFERENCE TO RELATED APPLICATIONS

The present application claims priority to and is a continuation of U.S. application Ser. No. 14/075,232 entitled "BIOMETRIC CAMERA MOUNT SYSTEM" and filed on Nov. 8, 2013, which claims priority to and is a continuation of U.S. application Ser. No. 13/464,710 entitled "BIOMETRIC CAMERA MOUNT SYSTEM" and filed on May 4, 2012, which claims priority to and is a continuation of U.S. application Ser. No. 12/749,663 entitled "BIOMETRIC CAMERA MOUNT SYSTEM" filed on Mar. 30, 2010, which claims the benefit of and priority to U.S. Provisional Application 61/164,528, entitled "BIOMETRIC CAMERA MOUNT SYSTEM" and filed on Mar. 30, 2009, all of which are incorporated herein by reference in their entirety.

BACKGROUND OF THE INVENTION

Biometrics is the science and technology of measuring and analyzing biological data, such as the imagery of the face or iris. There are 2 problems that need to be overcome with the acquisition of biometric data: (i) ensuring that the biological data is within the field of coverage of one or more of the biometric sensors, and (ii) ensuring that the data is acquired as uniformly as possible so that comparison of data from the same user across different time periods is facilitated.

SUMMARY OF THE INVENTION

Figure 1:
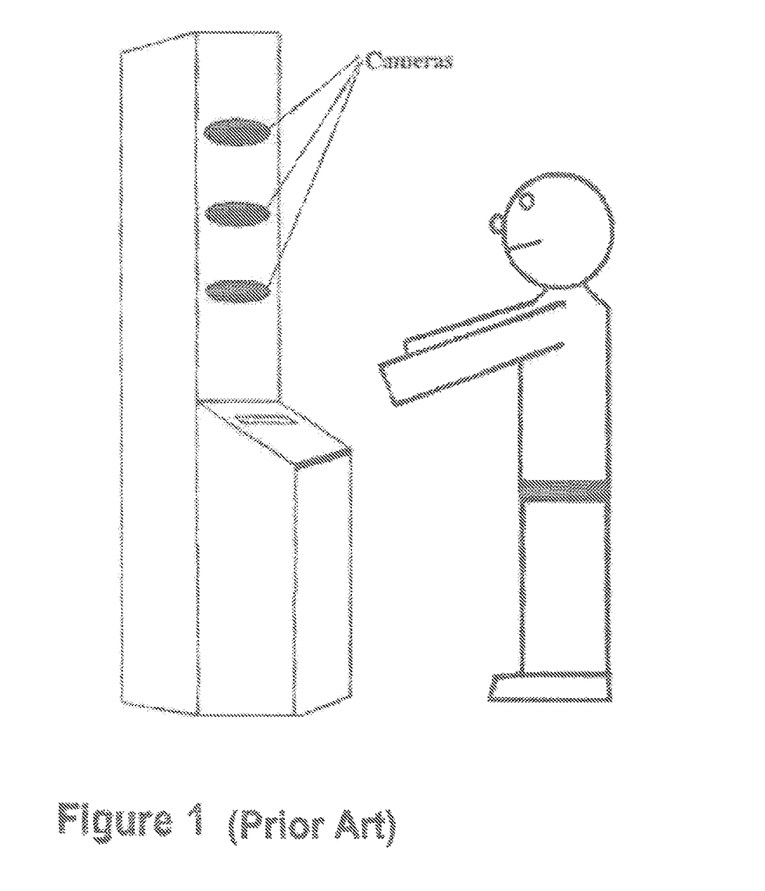
FIG. 1 shows prior art whereby multiple cameras are mounted in front of a user at a fixed angle and at a fixed height such that the face of the person is in the field of view of at least one of the cameras.

One existing approach to ensuring that the biological data is within the field of coverage is shown in FIG. 1 (prior art). In this system called Smart Gate, face imagery is acquired by one of 3 cameras mounted vertically in front of a user. The user is asked to stare straight forward at a kiosk, and the cameras are stacked vertically parallel to each other with a large vertical spacing so that the camera closest to the height of the user always captures a frontal view of the face. Ensuring a frontal view of the user facilitates comparison of the same user at a different time period, and improves overall system match performance.

Figure 2:
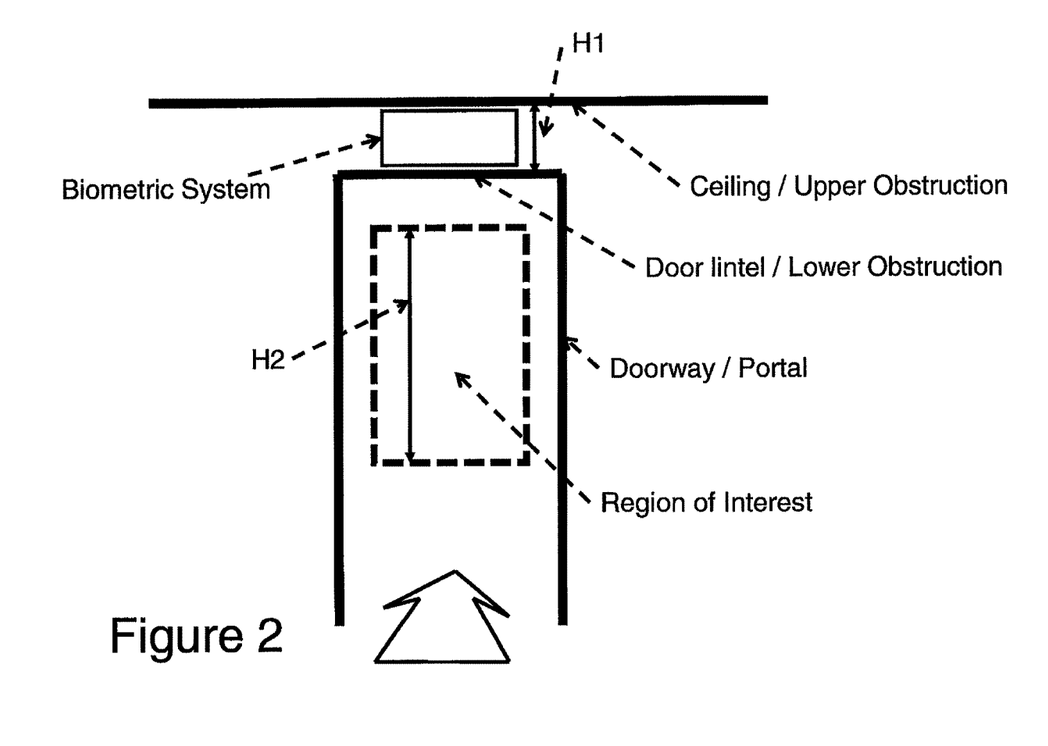
FIG. 2 shows a configuration where a biometric device is mounted above a doorway and covers a region of interest within the doorway.

FIG. 2 shows a different configuration for a biometric system. In this case, the biometric system has to be mounted between the top of a doorway and a ceiling (H1 in FIG. 2) which is typically 8-12". In general, the biometric system has to be mounted in a very small vertical space between a lower obstruction and a higher obstruction. Unfortunately, the vertical region of interest of the system, H2, is typically much larger than the vertical space H1 that is available to mount the biometric system. H2 is typically 24" or more. Even if H1 is greater than H2 such that the cameras in FIG. 1 could be raised above a doorway, then a problem still exists since if the user is asked to look straight ahead or at a fixed point, then a camera view will acquire a vertically skewed, perspective view of the person's face or is, which makes matching the biometric data much more difficult.

Figure 3:
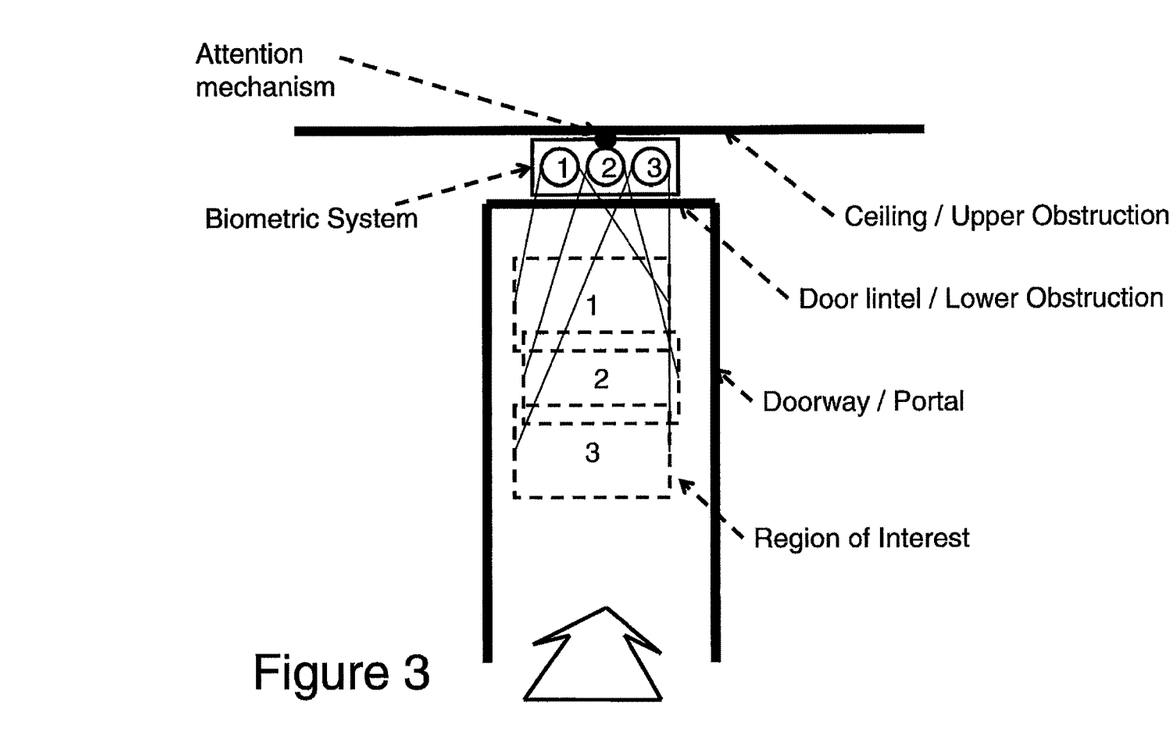
FIG. 3 shows a particular configuration ofa biometric device mounted above a doorway comprising an attention mechanism, and three cameras mounted horizontally covering a vertical region of interest.

FIG. 3 shows how the problem has been addressed. First, the cameras are mounted horizontally in the gap H1 rather than vertically. Mounting the cameras horizontally reduces significantly the vertical space occupied, and each camera is tilted and panned carefully to cover a different vertical portion of the region of interest as shown in FIG. 3 by the number of the camera and the number of the region of interest. Second, the horizontal spacing between the cameras is minimized as much as physically possible. A preferred separation is 2" or 4". The approach of mounting the cameras horizontally saves vertical space, but it potentially introduces a new problem in that horizontally skewing of the imagery of the subject will occur, in addition to the vertical skewing discussed earlier which as discussed previously makes the matching of the biometric data much more difficult. By mounting the cameras with a close horizontal separation however minimizes the degree of horizontal skewing. Thirdly, an attention-mechanism, such as a video screen showing live video of the user as they use the system, is placed near the cameras. The user is then asked to look at the video screen. Users who are short and are at the bottom of the region of interest will have to look up at a greater tilt angle than users who are tall and are at the top of the region of interest. The benefit of this approach is that vertical skewing of the imagery introduced by the position of the cameras is cancelled out by the user tilting their head to the same vertical height as all the cameras.

DETAILED DESCRIPTION OF THE INVENTION

Because the cameras are all at the same height, then the vertical skewing will be cancelled out equally in all camera views. If an attention mechanism at the camera cannot be applied due to the physical constraints of the system, then an alternative more complex solution to this third step is a fore shortening compensation algorithm to remove the vertical skewing.

While this discussion has focused on allowing a substantially vertical region of interest to be covered using a horizontal arrangement of cameras, alternatively the same method could be used such that a substantially horizontal region of interest is covered using a vertical arrangement of cameras. The cameras could also be pan/tilt/zoom cameras, either moved directly or by means of a mirror.

Figure 4:
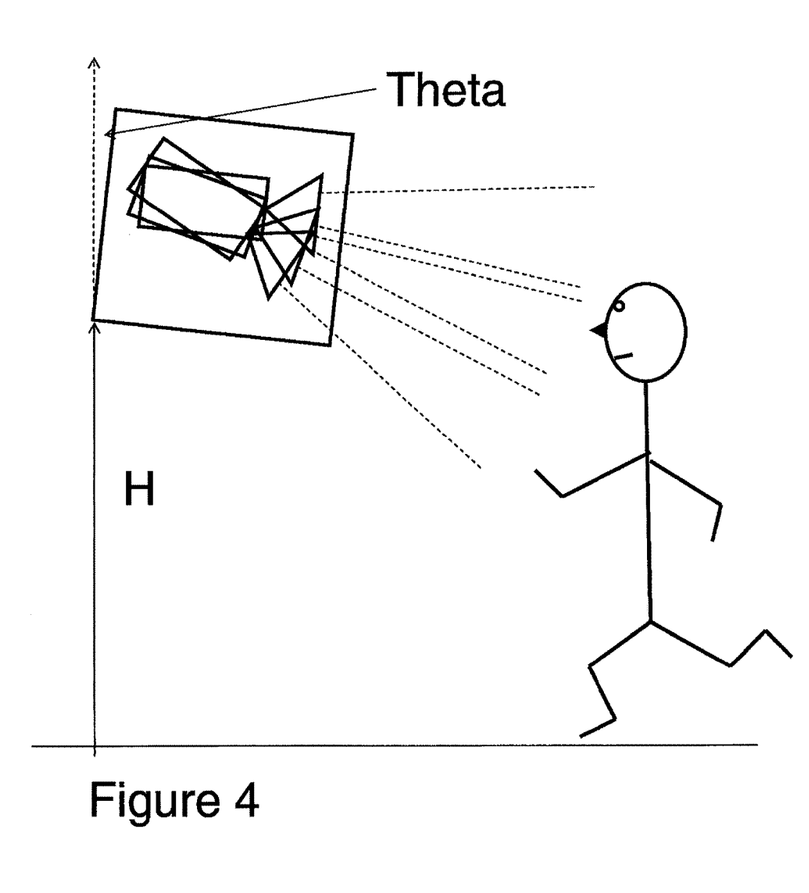
FIG. 4 shows a profile view of a biometric system mounted above a doorway, showing how the region of interest depends on the height H of the device and the tilt Theta of the device.

FIG. 4 shows a profile view of amount of a biometric system between a ceiling and a doorway. There are two problems with such an installation compared to the installation of a traditional biometric system. First, traditional biometric systems typically have carefully defined specifications that define the precise height that the unit should be mounted above the floor. However, when mounting a system between a ceiling and a doorway, the height of the doorway and the height of the ceiling dictates the vertical positioning, H, of the system, and not the installation manual. Further, the heights of doorways and ceilings vary substantially. This is very problematic since a biometric system designed for a certain vertical region of interest to capture a range of heights will not function properly if mounted at an unspecified height. Further, traditional biometric systems have typically acquired data within a small distance (approximately within 8-12") so that any slight angle, theta, in the pitch of the device does not move the vertical region of interest substantially. However, more recent biometric systems can acquire data many feet away from the device, and therefore any slight angle, theta, in the pitch of the device can move the vertical region of interest substantially. The slight variations in pitch and height of the device depend on the circumstances that arise during actual installation, such as the flexing of the wall mounting points, and therefore cannot be calculated from site survey measurements with sufficient accuracy to allow adjustment at the factory. We have developed a method that allows an unskilled installation technician to adjust a complex biometric system in a very short period of time, thereby minimizing installation time and cost.

Figure 5:
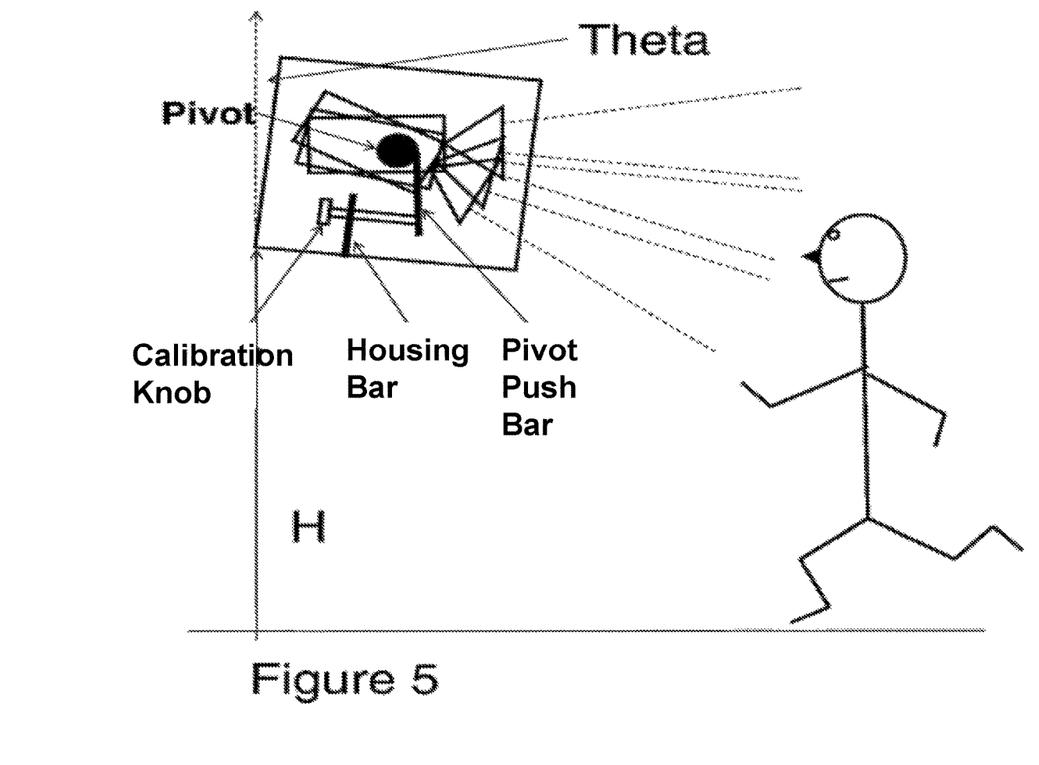
FIG. 5 shows a profile view of a biometric system mounted above a doorway whereby the cameras are mounted on a pivot the angle of which is adjusted by a calibration knob, such that the vertical region of interest of the biometric device can be adjusted on-site depending on deployment-specific constraints on the height and angle of the device.

FIG. 5 shows the solution we have developed. The cameras are all mounted on a single camera module that in turn is mounted on a horizontal pivot. A pivot push bar is attached to the camera module. A housing bar is attached to the case of the biometric system which in turn is attached to the wall or other installation arrangement. A calibration knob comprising a screw thread is screwed through the housing bar and pushes against the pivot push bar. The installation technician installs the biometric unit without having to be concerned substantially with the pitch of the device, and only has to ensure that the device lies within a very broad height range (e.g. 6.5 ft-12 ft) which can be ascertained from inaccurate and rapid site-survey analysis. The installation technician is then able to adjust the precise vertical region of interest by rotating the calibration knob. Rotating the calibration knob during installation pushes the pivot push bar which in turns rotates the camera module within the housing. The installation technician can adjust the knob and then test performance at different heights in the region of interest. The use of the screwed thread as an adjustment mechanism has the benefit of (i) great precision in adjustment with a wide range of travel (ii) allows the operator to make relative adjustments to allow iterative calibration (e.g. turn the knob one revolution, re-test the biometric system, turn the knob a second revolution) without having to perform a difficult and error prone absolute calibration which may require the participation of a second person which increases cost, or requires additional calibration support materials such as target charts carefully positioned, which take time to set up and are error prone.

What is claimed is:

1. A biometric system comprising:
   two or more imaging sensors disposed horizontally on top of a frame to acquire biometric data of a person coming towards the frame, each of the two or more imaging sensors monitoring a respective region of interest, and vertically tilted and horizontally panned with respect to each other to dispose the respective regions of interest vertically with respect to each other so as to form a vertically expanded region of interest located in front of the frame; and
   a horizontal pivot for adjusting the respective regions of interest upwards or downwards by a same amount between the respective regions of interest.

2. The system of claim 1, wherein the sensors are closely spaced with respect to each other within a predetermined distance.

3. The system of claim 1, further comprising an attention mechanism located close to the two or more sensors within a predetermined distance from the two or more sensors.

4. The system of claim 3, wherein the attention mechanism comprises a video monitor configured to show imagery of the user.

5. The system of claim 3, wherein the attention mechanism is configured to draw a gaze of the person towards a direction of the two or more sensors.

6. The system of claim 1, further comprising an adjustment mechanism allowing tilt adjustment of a horizontal configuration of the two or more sensors about the horizontal pivot.

7. The system of claim 6, wherein the adjustment mechanism comprises a screw-thread mechanism.

8. The system of claim 1, wherein the physical orientation of the two or more sensors are fixed relative to one another after the respective regions of interest are disposed vertically with respect to each other.

9. The system of claim 1, wherein the respective regions overlap at least to some extent.

10. The system of claim 1, wherein the two or more sensors, as horizontally disposed, provides a reduced vertical profile for the system.

11. The system of claim 1, further comprising a sensor housing module housing the two or more camera sensors.

12. The system of claim 6, further comprising a sensor housing module comprising the pivot and the adjustment mechanism.

13. A method of acquiring biometric data, the method comprising:
   horizontally disposing two or more imaging sensors on top of a frame to acquire biometric data of a person coming towards the frame; and
   monitoring, by each of the two or more imaging sensors, a respective region of interest, each of the two or more imaging sensors vertically tilted and horizontally panned with respect to each other to dispose the respective regions of interest vertically with respect to each other so as to form an expanded region of interest located in front of the frame; and
   adjusting, via a horizontal pivot, the respective regions of interest upwards or downwards by a same amount between the respective regions of interest.

14. The method of claim 13, wherein horizontally disposing two or more imaging sensors comprises closely spacing the sensors with respect to each other within a predetermined distance.

15. The method of claim 13, further comprising locating an attention mechanism close to the two or more sensors within a predetermined distance from the two or more sensors.

16. The method of claim 15, further comprising displaying, by the attention mechanism, imagery of the user on a video monitor of the attention mechanism.

17. The method of claim 15, further comprising drawing, by the attention mechanism, a gaze of the person towards a direction of the two or more sensors.

18. The method of claim 13, further comprising enabling, by an adjustment mechanism, tilt adjustment of a horizontal configuration of the two or more sensors about the horizontal pivot.

19. The method of claim 18, wherein the adjustment mechanism comprises a screw-thread mechanism.

20. The method of claim 13, wherein the physical orientation of the two or more sensors are fixed relative to one another after the respective regions of interest are disposed vertically with respect to each other.

* * * * *